United States Patent [19]
Elvegaard

[11] Patent Number: 5,887,832
[45] Date of Patent: Mar. 30, 1999

[54] CLAMPING DEVICE FOR THE CLAMPING OF A TUBE TO A BASE

[76] Inventor: Eilif Elvegaard, Sigrid Undsets Vel 32, Fredrikstad, N-1600, Norway

[21] Appl. No.: 744,117

[22] Filed: Nov. 5, 1996

Related U.S. Application Data

[63] Continuation of Ser. No. 178,261, filed as PCT/NO92/00122, Jul. 10, 1992, published as WO93/01439, Jan. 21, 1993, abandoned.

[30] Foreign Application Priority Data

Jul. 12, 1991 [NO] Norway ..................................... 912743

[51] Int. Cl.⁶ ....................................................... F16L 3/22
[52] U.S. Cl. ......................... 248/68.1; 248/74.1; 248/74.4
[58] Field of Search ........................... 248/65, 68.1, 74.1, 248/74.4, 231.51, 231.61, 316.6

[56] References Cited

U.S. PATENT DOCUMENTS

| | | | |
|---|---|---|---|
| 4,224,721 | 9/1980 | Ohlson | 248/68.1 X |
| 4,618,114 | 10/1986 | McFarland | 248/68.1 X |

FOREIGN PATENT DOCUMENTS

| | | |
|---|---|---|
| B-373048 | 10/1983 | Austria . |
| A-2517745 | 10/1975 | Denmark . |
| 2231635 | 11/1990 | United Kingdom . |
| WO-A1-9110072 | 7/1991 | WIPO . |

*Primary Examiner*—Leslie A. Braun
*Assistant Examiner*—Derek J. Berger
*Attorney, Agent, or Firm*—Tilton, Fallon, Lungmus & Chestnut

[57] ABSTRACT

A clamping device for the clamping of one or more tubes to a support, comprising a base member (1) having at least one recess (2) for receiving a tube (4) or the like, a top plate (11) for bearing against the base member (1) at the side facing away from the support (6), and at least one fastening screw (7; 8) extending through aligned holes (12, 9; 13, 10) in the top plate (11) and the base member (1), for attachment to the support (6). Each fastening screw (7; 8) is a screw bolt holding such elements (1, 11) together as a completely preassembled, mounting-ready unit without loose elements, the screw at the end to be fastened to the support (6) having a head (14; 15) arranged to be passed through an adapted hole (16; 17) or slot in the support (6), and to be locked in relation to the support by tightening of a nut (18; 19) at the other end. The recess (2) is outwardly open and at its opening (3) is formed with a narrowed portion for gripping and securing an inserted tube (4), and the opening (3) faces either the support (6) or the top plate (11), the top plate in the latter case being formed so as to be pivotable about said fastening screw, to be able to expose the opening.

7 Claims, 1 Drawing Sheet

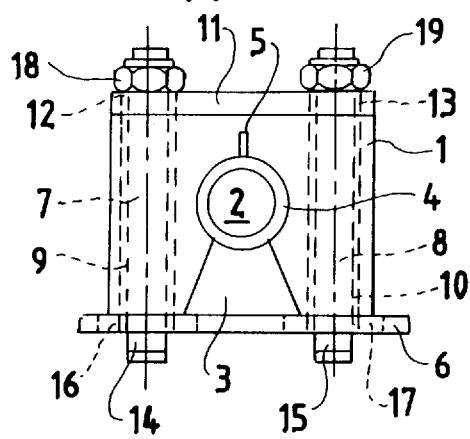
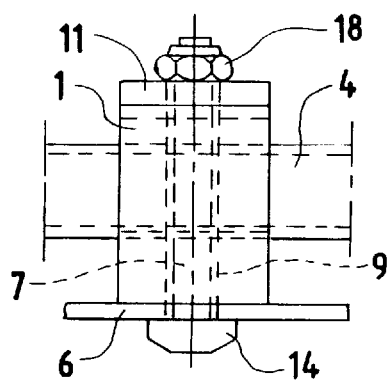
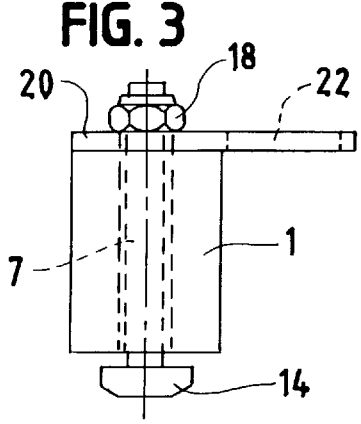
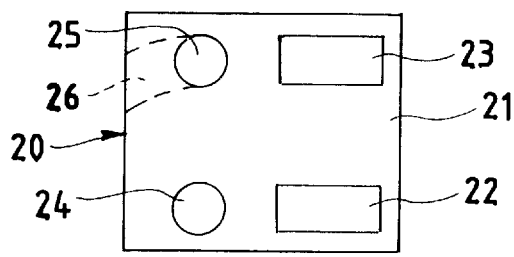
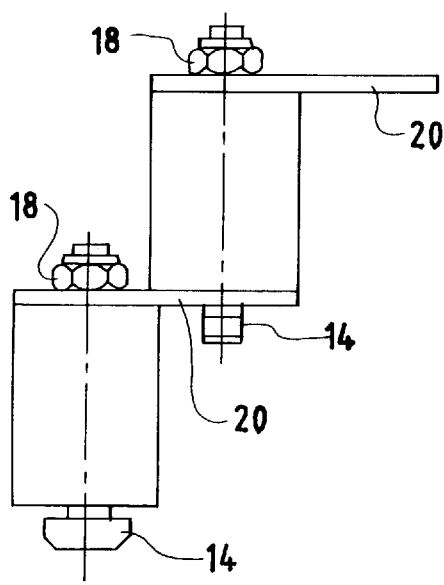
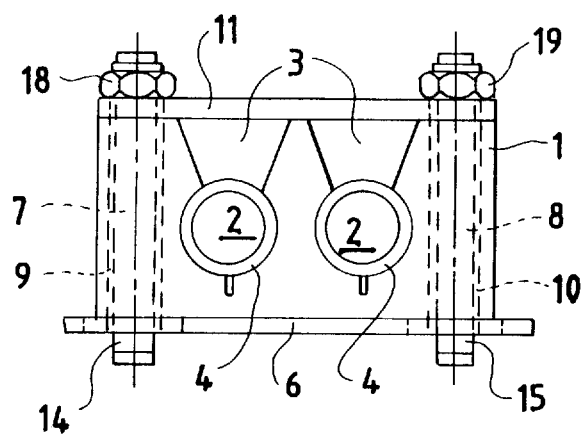

CLAMPING DEVICE FOR THE CLAMPING OF A TUBE TO A BASE

This application is a continuation of application Ser. No. 08/176,261, filed as PCT/NO92/00122, Jul. 10, 1992, published as WO93/01439, Jan. 21, 1993, now abandoned.

The invention relates to a clamping device for the clamping of one or more tubes or the like to a support, comprising a base member having at least one recess for receiving a tube or the like, a top plate for bearing against the base member at the side facing away from the support, and at least one fastening screw extending through aligned holes in the top plate and the base member, for attachment to the support.

Previously know clamping devices of the above-mentioned type usually have a base member consisting of a pair of equal halves of a corrosion-resistant material, such as a suitable plastic, which are kept together by through-going screws. The drawbacks of such clamps are that they consist of several elements and are relatively time-consuming to mount or dismount.

There are also known clamps which are made of plastic in one piece, and having recesses for one or more tubes. Such clamps firstly are fastened to the base or support, with the recess for the tube facing outwards, so that the tube thereafter may be pressed in place in the clamp. The drawbacks of clamps of this type are that they have a very limited ability to retain the tube with a sufficiently large force in installed position. Because of the fact that the resilience and the configuration of the recess must be adapted so that the tube easily may be pressed into the clamp, the force which is necessary for pulling the tube out of the clamp also becomes correspondingly small. The fastening screws only hold the clamp to the support, and the force retaining the tube in the clamp is only the resilience of the clamp material, without influence of the fastening screws. It is also known to furnish such claps with an upper member for achieving greater firmness.

There also exist clamps of the above-mentioned type which are designed as a clamp having a centrally disposed fastening screw, and having a recess on each side of the screw for equal tube diameters. In order to be able to install tubes of varying diameters, insert sleeves have to be used. The drawback of such clamps then is that they include several elements, and that they have to be dismounted in order to be able to mount several clamps on top of each other, and then with the use of correspondingly longer screws.

The object of the invention is to provide a clamping device which completely eliminates the above-mentioned drawbacks, and which reduces the mounting time in relation to known clamp types at the same time as the clamp also may be dismounted simply and quickly, without taking apart elements of the clamps, so that loose elements or components are avoided.

The above-mentioned object is achieved by means of a clamping device of the introductorily stated type which, according to the invention, is characterized in that the fastening screw is a screw bolt holding said elements together as a completely preassembled, mounting-ready unit without loose elements, the screw at the end to be fastened to the support having a head arranged to be passed through an adapted hole or slot in the support, and to be locked in relation to the support by tightening of a nut at the other end, that the recess is outwardly open and at its opening is formed with a narrowed portion for gripping and securing an inserted tube, and that the opening faces either the support or the top plate, the top plate in the latter case being formed so as to be pivotable about said fastening screw, to be able to expose the opening.

An advantageous embodiment of the clamping device is characterized in that the top plate has a portion projecting outside the base member and which is provided with at least one hole or slot which is adapted for introduction and locking of a respective fastening screw on an additional corresponding clamping device.

The clamping device according to the invention results in several advantages with respect to manufacture, stock-keeping, component ordering, mounting/dismounting time and total cost. The clamp can be delivered to the user fully preassembled with all components or elements, ready for use and consisting of only one unit, without loose elements of any kind. None of the elements are to be disassembled prior to mounting. The clamp can also be dismounted without disassembling any elements, so that the clamp also after dismounting is in the same condition, and can be used again.

The clamping device may be used in fastening or clamping of tubes, cables or the like, singly or several side by side. Thanks to the outwardly open recess and the gripping configuration thereof, all the necessary clamps on a tube length may be attached to the tube, so that the tube with attached clamps may be placed as a unit on the support or base to which the tube is to be fastened.

When using the above-mentioned advantageous embodiment wherein the top plate has a fastening portion projecting outside the base member, one or more clamps may be mounted on top of an already mounted clamp, for the clamping of tubes at several levels, without the use of any extra element, and without dismounting of or interference in the clamping device or clamping devices which is/are mounted. A clamp at any place in a stack of clamps which are mounted on top of each other, may be dismounted and possibly replaced by a clamp for another tube dimension, without dismounting neither the underlying nor the overlying clamp.

The invention will be further described below in connection with exemplary embodiments with reference to the drawings, wherein FIG. 1 shows a front view of an embodiment of a clamping device according to the invention;

FIG. 2 shows a side view of the clamping device in FIG. 1;

FIG. 3 shows a side view of another embodiment of the clamping device according to the invention;

FIG. 4 shows the top plate in the embodiment according to FIG. 3 as viewed from above;

FIG. 5 shows a side view of a pair of clamps according to FIG. 3 mounted on top of each other; and FIG. 6 shows a front view of an additional embodiment of a clamping device according to the present invention.

In the drawings, corresponding elements are designated by the same reference numeral in the various Figures.

As appears from the drawing, the clamping device in FIGS. 1 and 2 comprises a base member 1 which is provided with an outwardly open recess which extends transversely through the base member and within the opening 3 has a part-cylindrical portion for receiving a suitably dimensioned tube 4. The tube is inserted laterally through the lead-in opening 3 which, in the illustrated embodiment, tapers off inwards from the underside of the base member 1, so that the opening at the transition to the part-cylindrical portion is narrowed and narrower than the outer diameter of the tube 4. Thus, in its inserted position, the tube is gripped by the base member and kept in place in the recess.

In order to enable lateral introduction of the tube (or the like) which is to be fastened, the base member in the illustrated embodiment is made of a suitable resilient material, such as a suitable plastics. In order to increase the resilience and further facilitate the tube introduction, the base member is provided with a slot 5 extending a distance into the material from the bottom of the recess 2.

The base member 1 is fastened to a support 6 by a pair of fastening screws 7, 8 which are passed through respective holes 9, 10 extending through the base member on either side of the recess 2 at right angles to the longitudinal axis thereof. A top plate 11 is placed in and bears against the upper side of the base member, and the fastening screws are also passed through respective holes 12, 13 in the top plate, these holes being aligned with the holes 9, 10 in the base member. The top plate is made of a material which is not inflammable and which can sustain a very high temperature, preferably metal. Thus, the top plate together with the two fastening screws ensure that the tube does not fall out of and create problems in the case of a fire at the place of use.

The fastening screws of the clamping device are constituted by screw bolts keeping the above-mentioned components together as a preassembled and mounting-ready unit. For this purpose the screw bolts, at the end which is to be fastened to the support, have a head which can be passed through and adapted hole or slot in the support, and locked against the support by tightening of a locking nut threaded onto a thread at the other end of the bolt.

In the illustrated embodiment, the fastening screws 7, 8 are locking screws of the known and commercially available type which are denoted T screw. As suggested in FIGS. 1 and 2, these screws have a T-shaped head portion 14 and 15, respectively, which can be passed through an adapted elongate hole 16 and 17, respectively, in the support 6, and which—under the head—has a stop lug (not shown) which, with 90° rotation of the screw, locks the screw against continued rotation in the hole with tightening of the associated nut 18 and 19, respectively, of the screw. The holes in the support may have the same shape as the rectangular holes shown in the top plate in FIG. 4 which is to be further described later.

As an alternative to the above-mentioned T screws, the fastening screws may be usual locking screws having a head which can be passed through a keyhole-shaped hole in the support, and having a cellular formed under the head, usually in the form of a square screw cross-section, which—with introduction into the narrow portion of the "keyhole"—locks the screw against rotation, so that its nut can be tightened. (This embodiment is not shown in the drawing.)

It will be clear that the length of the locking screws in practice will be adapted to the thickness of the topical support, so that the desired locking is achieved immediately when the clamping device is brought in place in the intended holes in the support and the locking nuts have been tightened with a suitable wrench.

In the embodiment according to FIGS. 1 and 2 the base member 1 is provided with only on recess. If desired, however, the base member may be provided with several recesses side by side, possibly adapted for receiving respective tubes or the like having different dimensions.

Further, the base member 1 is shown to be formed in one piece, of a suitable resilient material. However, it may for instance also be divided in two parts located on either side of and defining the recess, and having a through-going hole for an associated fastening screw, as in FIG. 1, so that the parts are kept together as a unit. In this case the base member may consist of a non-resilient material, e.g. metal, the clearance between the fastening screws and the holes in the top plate then giving the necessary relative freedom of movement of the components for allowing the lateral introduction of the topical tube (or the like) in the recess of the clamp.

In the illustrated embodiment the clamping device includes two fastening screws, one on either side of the recess. However, it is also conceivable for the clamping device to have only one fastening screw of the type described above. In this case the top plate may, e.g., be formed as an angle iron, i.e. with an angular leg projecting downwards at the side of the base member which is without a fastening screw, to thereby attend to the function of the "missing" fastening screw with respect to securing of a clamped tube, even if the base member should melt or burn up in the case of a fire.

In the embodiment of FIGS. 1 and 2 the lead-in opening 3 of the recess is shown to face downwards towards the support 6. However, the base member may also be inverted, so that the opening faces the top plate 11, i.e. away from the support. In this case the top plate must be formed so as to be able to pivot about its fastening screw, or about one of the fastening screws if the clamp includes a pair of fastening screws, to be able to expose said opening in mounting or dismounting of a tube, without dismounting the clamp itself. For this purpose the top plate may be provided with an open screw passage from one side edge to the screw hole in question, for example in the form of a curved slot with the other screw hole in the top plate as the centre of curvature, as shown with dashed lines in FIG. 4.

The above-mentioned embodiment with a pivotable top plate also makes possible an embodiment wherein the clamping device includes a pair of base members according to FIG. 1 placed on top of each other and turned in opposite directions, or possibly formed in one piece, wherein one recess is open towards the support and the other towards the top plate.

FIGS. 3 and 4 show another embodiment of the clamping device. This embodiment is identical with the embodiment in FIGS. 1 and 2 except for the design of the top plate 20 which here has an extension portion 21 projecting a distance outside the base member 1 and being provided with a pair of holes 22, 23 which are adapted for introduction and locking of a pair of fastening screws on an additional, corresponding clamping device, as shown in FIG. 5. The holes 22, 23 therefore have a mutual distance which is equal to the distance between the holes 24, 25 in the top plate for the fastening screws (7 and 8 in FIG. 1) of the clamp, and they are rectangular in a manner corresponding to the holes 16, 17 in the support 6. The holes 22, 23 possibly could be replaced by open slots debouching at the right side edge of the top plate in FIG. 4, and they could also have another shape than that which is shown, dependent on the type of fastening screws which is used for the clamps.

In order to obtain a pivotable top plate in connection with a recess opening facing the top plate, the top plate may, as mentioned above, be provided with a curved lead-in slot 26 (shown with dashed lines) having a radius of curvature corresponding to the centre distance between the holes 24 and 25.

FIG. 5 shows a pair of clamps according to FIG. 3 which are mounted on top of each other by means of the extended top plate. It should be mentioned here that the top plate may also be further extended, to give space for more than one clamp for mounting on top of a lower clamp.

As regards the support or base for mounting of the clamp according to the invention, this may have a standardized design having a suitable hole pattern for receiving the current type of locking screws. It may also be practical to make use of prefabricated profiles or rails having suitable perforations (hole pattern), for fastening of clamps as well as for fastening of the profiles to different supports, with screws as well as by means of welding. Such elements may be out to desired lengths at the place of mounting.

I claim:

1. A clamping device for the clamping of one or more tubes by installation of one or more tubes by installation on a support, comprising a single piece base member having at least one recess for receiving a tube, said recess allowing insertion of a tube transversely to the longitudinal axis of the tube and having a narrowed portion for gripping an inserted tube, said base member having a first side for facing said support, and an opposite side for facing away from the support when said device is in an installed condition, a top plate for bearing against said base member at said opposite side, and at least one fastening element extending through aligned holes in said top plate and said base member and arranged for attachment to said support for installation of the device, said fastening element being a locking screw having a locking head at one end and a nut at the other end, whereby said locking screw, said base member and said top plate are kept together as an assembled unit without any loose parts prior to and during installation, said head of said screw being located at an end of the screw to be fastened to said support and being shaped to be passed through an elongated hole in said support, and to be locked to said support by tightening of said nut of said screw, said recess for facing either said support or said top plate when the device is in the installed condition, said top plate having a means enabling pivotal movement of the top plate about said fastening element in order to expose said recess when said device is installed with said recess facing said top plate, so as to allow said tube insertion transversely to said longitudinal axis of the tube.

2. A clamping device according to claim 1, wherein said aligned holes are a pair of aligned holes in said top plate and said base member on each side of said recess, each of said pair of aligned holes having one of said fastening elements extending therethrough.

3. A clamping device according to claim 1 or 2, wherein said top plate has a portion projecting laterally beyond said base member at one side thereof in the longitudinal direction of a longitudinal axis of said recess and being provided with at least one elongated hole which is adapted for introduction and locking of said head of an associated fastening element of an additional corresponding clamping device, whereby said top plate serves as a support for said additional clamping device.

4. A clamping device according to claim 1 or 2, wherein said base member is made of a resiliently yieldable material.

5. The clamping device of claim 2, wherein said means enabling pivotable movement of the top plate about said fastening element in order to expose said recess so as to allow said tube insertion transversely to said longitudinal axis of the tube comprises a curved lead-in slot at one of said holes in the top plate, said lead-in slot having a radius of curvature corresponding to a center-to-center distance between said holes in said top plate.

6. A clamping device for the clamping of one or more tubes by installation on a support, comprising a single piece base member having at least one recess for receiving a tube, the recess allowing insertion of a tube transversely to the longitudinal axis of the tube and having a narrowed portion for gripping an inserted tube, said base member having a first side facing said support, and an opposite side facing away from away the support when said device is in an installed condition, a top plate for bearing against said base member at said opposite side, and at least one fastening element extending through aligned hole sin said top plate and said base member and arranged for attachment to said support for installation of the device, said fastening element being a locking screw having a locking head at one end and a nut at the other end, whereby said locking screw, said base member and said top plate are kept together as an assembled unit without any loose parts prior to and during installation, said head of said screw being located at an end of the screw to be fastened to said support and being shaped to be passed through an elongated hole in said support, and to be locked against said support by tightening of said nut of said screw, said recess facing either said support or said top plate when the device is in the installed condition, said top plate having a means enabling pivotal movement of the top plate about said fastening element in order to expose said recess when said device is installed with said recess facing said top plate so as to allow said tube insertion transversely to said longitudinal axis of the tube;

said top plate having a portion projecting laterally beyond said base member at one side thereof in the longitudinal direction of a longitudinal axis of said recess and being provided with at least one hole which is adapted for introduction and locking of said head of an associated fastening element of an additional corresponding clamping device, whereby said top plate serves as the support for said additional clamping device.

7. The clamping device of claim 6, wherein said means enabling pivotal movement of the top plate about said fastening element in order to expose said recess so as to allow said tube insertion transversely to said longitudinal axis of the tube comprises a curved lead-in slot at one of said holes in the top plate, said lead-in slot having a radius of curvature corresponding to a center-to-center distance between said holes in said top plate.

* * * * *

UNITED STATES PATENT AND TRADEMARK OFFICE
CERTIFICATE OF CORRECTION

PATENT NO. : 5,887,832
DATED : March 30, 1999
INVENTOR(S) : Eilif Elvegaard

It is certified that error appears in the above-indentified patent and that said Letters Patent is hereby corrected as shown below:

In Claim 6, lines 7, 8, and 27, before "facing" insert --for--; and line 14, delete "hole sin" and substitute --holes in--.

Signed and Sealed this

Sixteenth Day of November, 1999

Attest:

Q. TODD DICKINSON

Attesting Officer    Acting Commissioner of Patents and Trademarks